(12) United States Patent
Sigel et al.

(10) Patent No.: US 6,890,625 B2
(45) Date of Patent: May 10, 2005

(54) SURFACE COVERING HAVING GLOSS IN-REGISTER AND METHOD OF MAKING

(75) Inventors: Gary A. Sigel, Millersville, PA (US); William J. Kauffman, Manheim, PA (US); Donald E. Barshinger, East Prospect, PA (US)

(73) Assignee: AWI Licensing Company, Wilmington, DE (US)

( * ) Notice: Subject to any disclaimer, the term of this patent is extended or adjusted under 35 U.S.C. 154(b) by 267 days.

(21) Appl. No.: 09/777,040

(22) Filed: Feb. 5, 2001

(65) Prior Publication Data

US 2002/0168501 A1 Nov. 14, 2002

(51) Int. Cl.⁷ .............................. B32B 3/00; B32B 3/02
(52) U.S. Cl. ...................... 428/195.1; 428/76; 428/206; 428/207; 428/542.2; 428/908.8
(58) Field of Search ................ 428/195.1, 76, 428/206, 207, 542.2, 908.8, 195, 158, 480

(56) References Cited

U.S. PATENT DOCUMENTS

| | | | |
|---|---|---|---|
| 3,929,929 A | 12/1975 | Kuehn | 260/859 |
| 3,943,080 A | 3/1976 | Wismer et al. | 260/20 |
| 3,948,839 A | 4/1976 | DeVries | 260/29.4 |
| 4,034,017 A | 7/1977 | Chang et al. | 260/859 |
| 4,070,497 A | 1/1978 | Wismer et al. | 427/44 |
| 4,076,567 A | 2/1978 | Yoshikawa et al. | 156/219 |
| 4,169,167 A | 9/1979 | McDowell | 427/54 |
| 4,214,028 A | 7/1980 | Shortway et al. | 428/159 |
| 4,257,834 A | 3/1981 | Iida et al. | 156/73.6 |
| 4,263,051 A | 4/1981 | Crawford et al. | 106/308 Q |
| 4,273,819 A | 6/1981 | Schmidle et al. | 428/159 |
| 4,309,452 A | 1/1982 | Sachs | 427/44 |
| 4,313,969 A | 2/1982 | Matthews et al. | 427/44 |
| 4,393,187 A | 7/1983 | Boba et al. | 528/60 |
| 4,456,643 A * | 6/1984 | Colyer | 428/156 |
| 4,491,616 A | 1/1985 | Schmidle et al. | 428/158 |
| 4,617,222 A | 10/1986 | Courtoy et al. | 428/142 |
| 4,689,259 A * | 8/1987 | Miller et al. | 428/142 |
| 4,781,987 A | 11/1988 | Bolgiano et al. | 428/424 |
| 4,855,165 A | 8/1989 | Bolgiano et al. | 427/393.5 |
| RE33,069 E | 9/1989 | Courtoy et al. | 428/142 |
| 4,983,443 A | 1/1991 | Balmer et al. | 428/158 |
| 5,003,026 A | 3/1991 | Ehrhart et al. | 528/49 |
| RE33,599 E | 5/1991 | Courtoy et al. | 428/141 |
| 5,091,211 A * | 2/1992 | Richard | 427/519 |
| 5,407,708 A | 4/1995 | Lovin et al. | 427/493 |
| 5,441,563 A | 8/1995 | Sideman et al. | 106/224 |
| 5,562,951 A | 10/1996 | Kamen | 427/493 |
| 5,643,677 A | 7/1997 | Feifer et al. | 428/424.6 |
| 5,663,003 A | 9/1997 | Ehrhart et al. | 428/482 |
| 5,719,227 A | 2/1998 | Rosenberry et al. | 524/590 |
| 5,830,937 A * | 11/1998 | Shalov et al. | 428/502 |
| 5,843,576 A | 12/1998 | Rosenberry et al. | 428/423.1 |
| 5,985,416 A * | 11/1999 | Sherman et al. | 428/195 |
| 6,110,315 A | 8/2000 | Keding | 156/219 |
| 6,130,270 A | 10/2000 | Ukon et al. | 522/182 |
| 6,333,076 B1 * | 12/2001 | Sigel et al. | 427/487 |

FOREIGN PATENT DOCUMENTS

| | | | | |
|---|---|---|---|---|
| EP | 0 947 254 | 10/1999 | | B05D/3/06 |
| EP | 1 072 659 | 1/2001 | | C09D/167/07 |

* cited by examiner

Primary Examiner—Rena Dye
Assistant Examiner—Lawrence Ferguson

(57) ABSTRACT

Surface covering components that include a topcoat layer with different gloss levels in various regions on the top coat layer, and methods of manufacturing such surface covering components, are disclosed. The surface covering components include a coating layer that includes regions that have a relatively higher gloss, and regions with a relatively lower gloss. The differential gloss is provided by coating a substrate with a UV-curable coating composition, subjecting a first region of the surface coating to polymerization under a first set of conditions, and subjecting a second region of the surface coating to polymerization under a second set of conditions. The UV-curable coating compositions include UV-curable components and one or more flatting agents. The different polymerization conditions involve applying various photoinitiators, thermal initiators and/or cure altering agents to some regions of the coated substrate, and not applying these components to other regions of the substrate. The components are applied in the form of a pattern. Regions in contact with these components are cured at different rates in one step or in different steps, for example, sequential UV and EB irradiation or UV irradiation at different wavelengths and/or exposure times. The resulting surface coverings and surface covering substrates have differential gloss in register with the printed and/or sprayed patterns.

36 Claims, 1 Drawing Sheet

SURFACE COVERING HAVING GLOSS IN-REGISTER AND METHOD OF MAKING

FIELD OF THE INVENTION

The present invention relates generally to the field of surface coverings. More particularly, the present invention relates to surface coverings including a top coat layer with differential gloss in various regions on the top coat layer, as well as methods of making such surface coverings.

BACKGROUND OF THE INVENTION

Many decorative surface coverings, particularly in the flooring industry, include a topcoat layer with a high or low gloss appearance. For example, a matte or satin finish may be used to provide a more natural appearance for decorative patterns, such as wood, slate, mosaic, brick, and other natural products, which have been printed onto a substrate. Typically, a low gloss or matte coating can enhance the appearance of such a decorative pattern. The appearance can be further enhanced using both matte and glossy areas, which can provide a more realistic visual or natural appearance of a natural product. Ideally, the gloss level of the coating should be tailored for the individual pattern and complement the characteristics of the pattern and any mechanically embossed texture.

Composite flooring products have been produced in which the exposed surface has different gloss effects. Such composite flooring products are typically produced using multiple coat cure stations that include a coater and ultraviolet (UV) medium pressure-mercury vapor lamps. Such processes are inherently difficult to control.

There remains a need for additional methods of making floor coverings with differential gloss effects, and for surface coverings with such differential gloss effects. The present invention provides such methods, and surface coverings prepared according to these methods.

SUMMARY OF THE INVENTION

Surface coverings and surface covering components that include a topcoat layer with different gloss levels in various regions on the top coat layer, and methods of manufacturing such surface covering components, are disclosed. The surface coverings and surface covering components include a topcoat coating layer that includes regions that have a relatively higher gloss, and regions with a relatively lower gloss. The differential gloss is provided by coating a substrate with a UV-curable coating composition, subjecting a first region of the surface coating to polymerization under a first set of conditions, and subjecting a second region of the surface coating to polymerization under a second set of conditions. The UV-curable coating compositions include UV-curable components and one or more flatting agents.

In one embodiment, a pattern including a photoinitiator is printed on a substrate to be coated, optionally in register with a decorative pattern. A UV-curable coating composition that does not include a photoinitiator is applied and exposed to UV irradiation. Alternatively, or in addition, a pattern including a photoinitiator can be sprayed onto the substrate or the coating composition. Polymerization occurs substantially over those regions of the pattern including the photoinitiator. The uncured components are subjected to electron beam (EB) irradiation. The regions cured by exposure to UV irradiation have a relatively lower gloss than those regions cured by exposure to EB irradiation. The previously cured components, when contacted with EB irradiation, still maintain the relatively lower gloss. The result is a gloss-in-register with the pattern. The gloss level can also be controlled, for example, by adjusting the type and concentration of the photoinitiator and the UV dosage and intensity.

In another embodiment, differential curing involves printing a pattern including photoinitiators and/or cure altering agents such as promoters or inhibitors in selected regions, and applying a coating composition that includes photoinitiators over the printed pattern. Alternatively, the cure altering agents and/or photoinitiators can be sprayed onto the substrate and/or the coating composition in the form of a pattern, alone or in combination with a printed pattern. The UV cure is promoted or inhibited over those regions of the pattern containing the cure altering agents, or more highly promoted in those regions that include higher concentrations and/or different types of photoinitiators. The differential curing of the first and second regions can be accomplished in one process step, or in multiple process steps. For example, two or more different sets of UV curing conditions or a combination of UV and EB curing can be used to provide a differential gloss in register with the printed pattern.

A number of surface covering substrates and surface coverings can be prepared using the methods described herein. The coverings can include a substrate, for example, a foamable substrate, which may or may not be chemically and/or mechanically embossed. They can include one or more layers of colored particles to provide a suitable design and/or a wear layer, which layers may or may not also be chemically and/or mechanically embossed. The top coat layer can also be mechanically embossed, typically after the top coat layer is cured by the second set of polymerization conditions, i.e., different UV conditions or EB. In one embodiment, a surface covering substrate including the top coat layer is laminated onto a surface to provide a surface covering.

The resulting surface coverings and surface covering substrates have differential gloss in register with a printed and/or sprayed pattern.

DETAILED DESCRIPTION OF THE INVENTION

Figure 1:
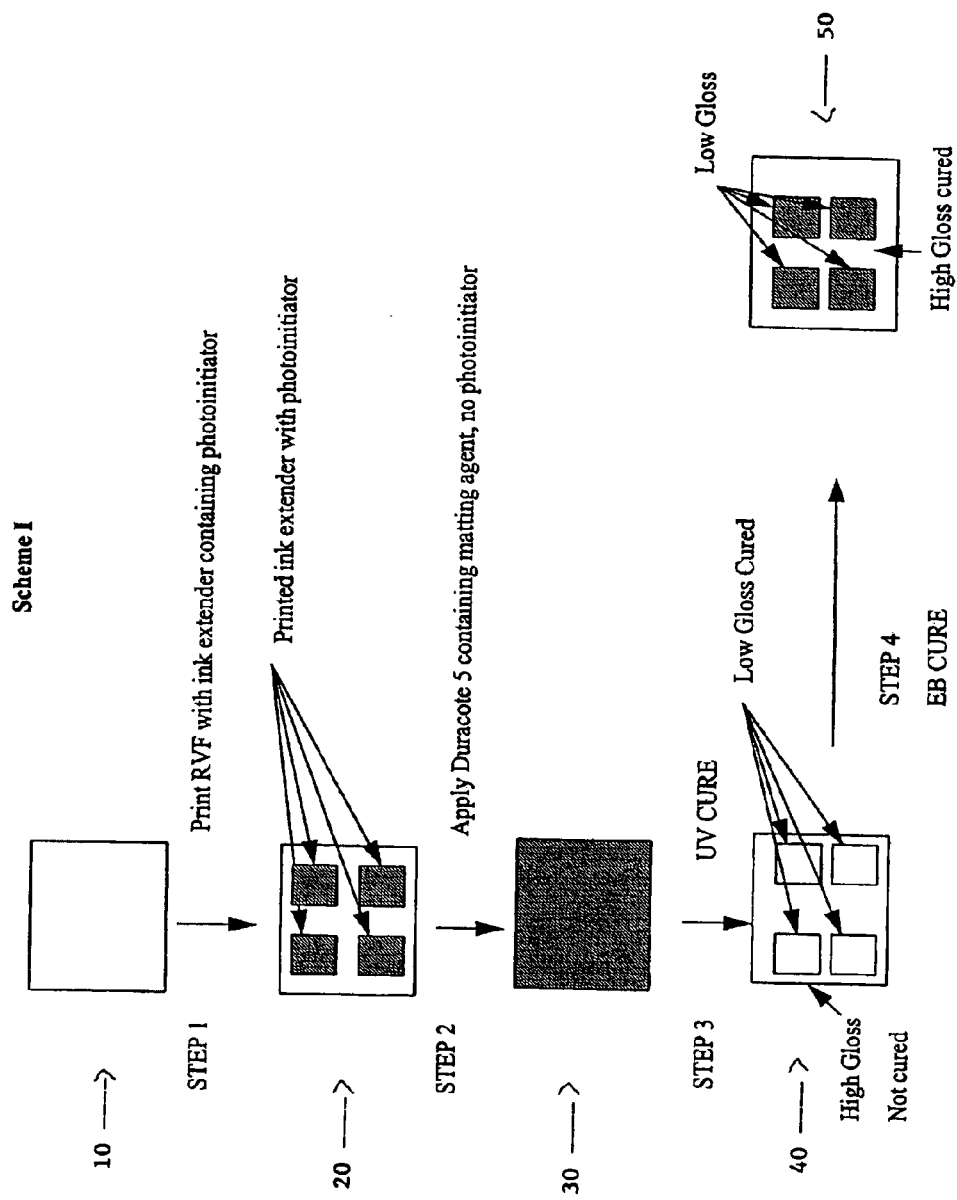
FIG. 1 is a schematic illustration of an embodiment of the methods described herein for providing a surface covering including regions with high gloss and regions with low gloss.

Surface covering components and surface coverings including differential gloss-in-register, and methods of making the coverings and/or components are disclosed. In one embodiment, the methods involve applying a pattern to a substrate, wherein the pattern comprises a gloss controlling agent such as a photoinitiator, thermal initiator and/or a cure altering agent. The patterned substrate is then coated with a radiation curable coating composition such as a UV-curable coating composition that includes UV-curable components. The radiation curable composition includes one or more flatting agents. In another embodiment, the gloss controlling agent is applied to the radiation curable coating composition coated substrate. A first region of the coated substrate is exposed to a first set of polymerization conditions and a second region of the coated substrate is exposed to a second set of polymerization conditions. The first region in contact with the pattern containing the gloss controlling agents polymerizes at a different rate than the second region not in contact with the pattern. In another embodiment, a photoinitiator, thermal initiator and/or cure altering agent are sprayed on top of the substrate and/or coating layer, alone or in combination with the printed pattern.

As used herein, "different polymerization conditions" refer to curing different regions of the top coat at different rates and/or using different process steps. In the methods described herein, various regions of the top coat are in contact with a) a patterned substrate containing a photoinitiator, thermal initiator and/or cure altering agent and/or b) a photoinitiator, thermal initiator and/or cure altering agent sprayed in the form of a pattern. Other regions are not in contact with the patterned substrate or sprayed photoinitiator (and/or thermal initiator) and/or cure altering agent. Exposing the top coat layer to various conditions, such as heat and/or UV irradiation, will either cure the UV-curable components in these regions at different rates, or, where a region is not in contact with a suitable photoinitiator or thermal initiator, such components may not be substantially cured. When curing occurs at different rates, the method can be conducted by exposing the top coat to a single set of conditions, i.e., of heat and/or UV irradiation, and still achieve different gloss levels in the different regions. When one or more regions remain essentially uncured following exposure to the first set of conditions, a second set of conditions can be applied (either to the uncured regions or to the entire top coat layer) to cure the essentially uncured regions. In one embodiment, the second set of conditions involves exposure to electron beam irradiation. This embodiment is particularly effective for regions that do not include and are not in contact with a photoinitiator and/or thermal initiator.

While not wishing to be bound to a particular theory, it is believed that the creation of lower gloss UV cured coatings by using flatting agents results from curing/polymerization from the bottom up instead of from the top down. Curing from the bottom up increases the concentration of the flatting agents at the surface, resulting in lower gloss. This movement occurs before the surface is sufficiently cured. If the rate of cure of the surface is faster than the movement/curing rate from the bottom, high gloss coatings are produced. However, this is a complicated process and dependent upon many factors that effect polymerization rate. For example, if the rate of cure from the bottom-up is so fast that it does not allow for movement of flatting agent toward the surface, a coating surface with a higher gloss can result. The polymerization rates and location of cure initiation can be effected by many material and process factors. These factors include initiator concentration/type, light scattering within the coating, UV absorption properties of the coating verses the photoinitiator, presence of inhibitors such as oxygen on the surface, UV wavelength, UV intensity, and others. In some embodiments, compositions without flatting agents can be cured in a differential manner to provide differential gloss.

For a more complete understanding of the present invention, reference should be made to the following detailed description taken in connection with the accompanying drawing.

UV-Curable Coating Compositions

The UV-curable coating compositions used herein include one or more UV-curable components, typically a monomer or oligomer including ethylenic unsaturation, and one or more flatting agents. The compositions can also include one or more aqueous and/or organic solvents, reactive diluents, UV photoinitiators, cure altering agents and other optional components. An example of a suitable coating composition is described in U.S. Pat. No. 5,719,227, the contents of which are hereby incorporated by reference.

The composition, when applied and cured as described herein, can provide differential gloss in register with a printed and/or sprayed pattern. Low gloss, in one embodiment, refers to a 60 degree gloss value, as measured by ASTM Standard D523-89, of about 30 units or less. Medium gloss, in one embodiment, refers to a gloss between about 30 and 60 units. High gloss, in one embodiment, refers to a gloss greater than about 60 units. In one embodiment, the difference between lower and higher gloss is at least about 20 gloss units.

The coating compositions, when cured as described herein, advantageously provide the surface coverings to which they are applied with acceptable performance properties for their intended use. For example, when used in floor coverings, such properties include good gloss retention, sufficient toughness to resist gouging from foot traffic, abrasion resistance to everyday wear, and a certain degree of flexibility once cured such that the surface coverings can be wound into a roll with a small diameter core. In one embodiment, the coatings have sufficient strength to withstand embossing of the coated substrate surface without cracking or crazing.

UV Curable Monomers

Any suitable monomer or oligomer that can form a coating layer when applied to a surface and UV-cured can be used. Such monomers and oligomers are well known to those of skill in the art. In one embodiment, the oligomers are liquid at room temperature, highly branched, and have multi(meth)acrylate functionality. As used herein, term "(meth)acrylate" and its variants mean "acrylate, methacrylate and mixtures thereof."

Examples include polyester (meth)acrylates, polyurethane (meth)acrylates, polyester-urethane acrylates, acrylated epoxy, polyepoxides compounds and mixtures thereof. In one embodiment, the urethane acrylates are derived from aliphatic diisocyanates that give crosslink density and glass transition temperatures in the appropriate range for a floor wear surface. Suitable monomers and/or oligomers are disclosed, for example, in U.S. Pat. No. 5,843,576 to Rosenberry et al., U.S. Pat. Nos. 3,929,929, 4,034,017, 4,034,017, and 5,003,026, the contents of which are hereby incorporated by reference.

In one embodiment, the resin structure includes one or more of a diisocyanate and/or isocyanurate structure, a polyester polyol, and a polyester that includes a hydroxy and an acrylyl functionality.

Coating compositions that essentially include only the oligomer can be used, but tend to be viscous and difficult to coat. In one embodiment, the coating compositions include a diluent such as a reactive (meth)acrylate diluent, for example, mono, di and trifunctional acrylates.

Reactive Diluents

Examples of suitable reactive diluents include (meth) acrylic acid, isodecyl (meth)acrylate, N-vinyl formamide, isobornyl (meth)acrylate, tetraethylene glycol (meth) acrylate, tripropylene glycol (meth)acrylate, hexanediol di(meth)acrylate, ethoxylate bisphenol-A di(meth)acrylate, ethoxylated neopentyl glycol di(meth)acrylate, propoxylated neopentyl glycol di(meth)acrylate, ethoxylated tripropylene glycol di(meth)acrylate, glyceryl propoxylated tri (meth)acrylate, tris (2-hydroxy ethyl) isocyanurate tri(meth) acrylate, pentaerythritol tri(meth)acrylate, pentaerythritol tetra(meth)acrylate, dimethylol propane tri(meth)acrylate dipentaerythritol monohydroxypenta(meth)acrylate, trimethylol propane and tri(meth)acrylate and ethoxylated and propoxylated analogues thereof.

In one embodiment, the reactive diluents are multifunctional acrylates with number average molecular weights of about 226 to about 2000. Examples include tetraethylene glycol diacrylate with a molecular weight of about 302, ethoxylated bisphenol-A diacrylate with a number average molecular weight of about 776 (SR602 from Sartomer Company), trihydroxyethyl isocyanurate triacrylate with molecular weight of about 423 (SR368 from Sartomer), trimethylol propane triacrylate with a number average molecular weight of about 296 (SR351 from Sartomer), and ethoxylated trimethylol propane triacrylates with number average molecular weights from about 400 to about 2000 (SR454, SR499, SR502, SR9035, and SR 415 from Sartomer Company and Photomer 4155 and Photomer 4158 from Henkel Corporation).

UV Photoinitiators, Thermal Initiators and Cure Altering Agents ("Gloss Controlling Agents")

In one embodiment, UV photopolymerization is conducted in the presence of one or more photoinitiators, alone or in combination with cure altering agents such as photosensitizers, accelerators, inhibitors and the like. These components can be applied using printing methods well known to those of skill in the art onto a layer adjacent to the coating composition, for example, in the form of an ink extender composition. However, the methods described herein are not limited to how the cure altering agents are applied, as long as the desired effect is achieved. In one embodiment, the photoinitiators or cure altering agents are applied to the tops of a embossed substrate using a differential direct roll ("kiss") coater.

Cure altering agents include agents that promote or inhibit curing. If the agents promote curing, then UV-curable components in regions including these agents will cure at a faster rate when subjected to the first set of polymerization conditions. If the agents inhibit curing, then UV-curable components in regions including these agents will not fully cure or cure at a slower rate when subjected to the first set of polymerization conditions. Curing can be promoted not only with cure altering agents, but also with different concentrations or types of photoinitiators in a given region.

Ink binder/extender compositions are well known to those of skill in the art. In one embodiment, the ink extender composition includes a polvinylacetate/polyvinyl chloride copolymer in a suitable organic solvent such as isopropyl acetate (Penn Color Inc. 13C870). Other hydroxy-modified vinyl chloride/vinylacetate resins such as VAGH resin (Union Carbide) can also be used. The ink binder/extender compositions can include acrylates such as PMMA (polymethyl methacrylate) or derivatives thereof, and other varnish systems that include combinations of PMMA and/or derivatives thereof and polyvinylidine chloride and/or polyvinylidine fluoride. Other compositions can be selected depending upon the materials used to make the substrate. Ink binders/extenders are not necessarily required to achieve differential gloss effects according to the methods described herein.

Photoinitiators can include benzophenone-type initiators, phosphine oxides, acetophenone derivatives, and cationic photoinitiators such as triaryl sulfonium salts and aryliodonium salts. In one embodiment, the photoinitiator is water-soluble. Examples include benzophenone; 4-methylbenzophenone; benzyl dimethyl ketal; diethoxy acetophenone; benzoin ethers; thioxanthones; 1-hydroxycyclohexyl phenyl ketone (Irgacure 184 from Ciba Corp); 2-hydroxy-2-methyl-1-phenol-propane-1-one; 4-(2-hydroxyethoxy)phenyl-(2-hydroxy-2-methylpropyl) ketone; 2,4,6-trimethylbenzoyl diphenylphosphine oxide; bis (2,6-dimethoxybenzoyl)-2,4,4-trimethylpentyl phosphine oxide; 2,2-dimethoxy-2-phenyl acetophenone; 2-benzyl-2-N,N-dimethylamino-1-(4-morpholinophenyl)-1-butanone; and 2-methyl-1-[4-(methylthio)phenyl]-2-morpholino propan-1-one. In one embodiment, the photoinitiator is benzophenone, alone or in combination with other photoinitiators, photoactivators and/or photosensitizers. In another embodiment, free radical initiators that generate radicals upon exposure to heat rather than light ("thermal initiators"), for example, various peroxide initiators, can be used, alone or in combination with photoinitiators. Such thermal initiators are well known to those of skill in the art. In this case, heat or a combination of heat and UV irradiation may be employed in the first set of polymerization conditions.

Commercially available photoinitiators that can be used include Darocur 1173 (2-hydroxy-2-methyl-1-phenyl-propan-1-one), Irgacure 184 (1-hydroxycyclohexyl phenyl ketone), Darocure 4265 (50% 2-hydroxy-2-methyl-1-phenyl-1-one and 50% 2,4,6-trimethylbenzoyldiphenylphosphine oxide), Irgacure 907 (2-methyl-1-[4-(methylthio)phenyl]-2-morpholino propan-1-one), Irgacure 1700 (25% bis (2,6-dimethoxybenzoyl)-2, 4,-4-trimethylpentyl phosphine oxide and 75% 2-hydroxy-2-methyl-1-phenyl-propan-1-one), benzophenone, Irgacure 819 (BAPO phenyl bis(2,4,6-trimethylbenzoyl)-phosphine oxide), Lucrin (MAPO diphenyl(2,4,6-trimethylbenzoyl phosphine oxide), and Irgacure 651 (alpha, alpha-dimethoxy-alpha-phenyl acetophenone), each of which is commercially available from Ciba Geigy.

Photosensitizers and accelerators can include but are not limited to ITX (isopropyl thioxanthone, Aceto), and CTX (chlorothioxanthone), quinones such as camphorquinone, Michler's Ketone (4,4'-bis(dimethylamino)benzophenone, thioxanthone, benzanthrone, triphenyl acetophenone and fluorenone (each of which is available from Aldrich), dimethylethanolamine, methyldiethanolamine, triethanolamine, DMPT (N,N-dimethyl-para-toluidine), MHPT (N-[2-hydroxyethyl]-N-methyl-para-toluidine), ODAB (octyl-para-N,N-dimethylamino benzoate), and EDAB (ethyl-para-N,N-dimethylamino benzoate), each of which is commercially available from Ciba Geigy.

Free radical inhibitors can include but are not limited to N-nitroso-N-phenylhydroxylamine, ammonium salt, tris[N-nitroso-N-phenylhydroxylamine, aluminum salt, p-methoxyphenol MEHQ, hydroquinone and substituted hydroquinones, pyrogallol, phenothiazine, and 4-ethyl catechol. UV absorbers include hydroxyphenyl benzotriazole.

Additional photoinitiators and cure altering agents are described in U.S. Pat. No. 6,130,270, the contents of which are hereby incorporated by reference.

Flatting Agents

Various flatting agent additives are known for adjusting the gloss level of coatings. Examples of flatting agents include finely divided silica, and finely divided organic particles such as Pergopak M-3. Examples of suitable flatting agents are described in U.S. Pat. Nos. 3,943,080, 3,948,839, and 4,263,051, the contents of each of which are incorporated by reference.

Optional Components

The coating compositions can also include flow additives, thermal stabilizers, light stabilizers, dyes, pigments, optical brighteners, surfactants, plasticizers, defoamers, hard particles, metallic particles, and others as would be obvious to one skilled in the art.

Metallic and/or polymeric particles, hard particles and colored particles can also be added. Hard particles include, but are not limited to, aluminum oxide, quartz, carborundum, silica and glass beads. Such wear resistant fillers also provide enhanced scratch resistance to the final cured coating layer after it is cured. In one embodiment, the hard particles are particles with a hardness of 6 or more on the Mohs scale.

Surface Coverings

Virtually any surface covering substrate can be coated with the coating compositions described herein. Examples of surface covering substrates that can be prepared using the compositions and methods described herein include those described, for example, in U.S. Pat. Nos. 4,781,987, 4,855, 165 and U.S. Pat. No. 5,643,677, the contents of which are hereby incorporated by reference. Examples of surface covering substrates include resilient sheet and tile goods. These can contain crosslinked wear layers, such as those derived from urethanes, (meth)acrylated urethanes, unsaturated polyesters and the like, all of which are well known to those of skill in the art.

Surface coverings that include these substrates and a differential gloss top coat layer formed from the coating compositions can be, for example, floor coverings, wall and ceiling coverings, countertops, laminates, and other surfaces that can be covered with decorative surface coverings. Examples include wallpaper, vinyl floors and the like.

The substrate may include resilient flooring structures. Such substrates are well known in the art, and can include layers such as felt backing materials, encapsulated glass mats, plastisol films, foams, transparent films, hot-melt calendared layers (for example, of a polyvinyl chloride, polyolefin or other thermoplastic polymer), randomly dispersed vinyl particles, stencil disposed vinyl particles, and the like. The selection of these materials is within the skill of an ordinary artisan. The thickness of such substrates is typically, but not necessarily, in the range of about 40 to about 100 mils.

In one embodiment, the surface covering includes a chemically embossed layer, formed before, during or after the coating composition is applied and cured. This type of layer is typically applied as a foamable gel, and the gel can include foaming agents or foaming promoters or inhibitors. The thickness of the gel layer is typically, but not necessarily, in the range of 6 to 20 mils in an un-blown state, and between 12 and 60 mils when blown ("cured"). The foaming agents, promoters or inhibitors can be present in the gel layer and/or present in a printed pattern in an adjacent layer to the gel layer. Printed pattern layers are typically less than one mil in thickness when applied using a rotogravure process, or about one mil or greater when applied using a screen process. Such agents provide chemical embossing in register with the agents, where the foamed portion corresponds to the presence of the foaming agent and/or promoter, and the un-foamed portion corresponds to the absence of the foaming agent and/or the presence of a foaming inhibitor. Typically, the foaming is done by subjecting the foamable layer to elevated temperatures, for example, in the range of 120 to 250° C., in one embodiment, between 180 and 250° C., for between 0.5 and 10 minutes.

A clear wear layer can be but is not necessarily applied over the gel layer, typically but not necessarily with a thickness of between 10 and 20 mils. Such layers are commonly formed of a material that includes a PVC plastisol. A print layer can be printed on top of the wear layer and beneath the top coat layer, where the print layer includes various UV photoinitiators and/or cure altering agents. Alternatively, or in addition, such photoinitiators and/or cure altering agents can be sprayed on top of the wearlayer or coating of the UV-curable compositions in the form of a pattern.

In another embodiment, the substrate is a film that after coating and processing described herein results in film with a topcoat layer with differential gloss. This film can then be laminated or processed with other substrates to produce a surface covering. The film substrate can be transparent and preprinted with a decorative pattern using any printing technique known in the art. Film substrates are typically in the range of 2–10 mils in thickness, but thicknesses outside this range can be employed.

The UV-curable components in the top coat layer are cured by UV irradiation in register with the presence or absence of photoinitiators and cure altering agents. In those regions that UV irradiation does not sufficiently cure the components, additional exposure to UV irradiation and/or electron beam irradiation can be used to further cure the components in such regions, providing relatively higher gloss in such regions. The top coat layer formed using the coating compositions described herein, can be, but is not necessarily in the range of between 0.2 and 5 mils thickness. The resulting top coat layer has differential gloss in register with the printed and/or sprayed pattern, and, in one embodiment, has one or more of the following desired properties—resistance to cleaning agents and household stains, abrasion resistance and heat and light stability.

Methods of Applying the Photoinitiators, Thermal Initiators and/or Cure Altering Agents The photoinitiators and/or cure altering agents can be applied to the substrate and/or the top of the coating layer using any means well known to those of skill in the art. These include, rotogravure, flexo, screen, and transfer printing techniques, as well as non-contact techniques such as spraying, inkjet, or other digital printing techniques. For example, when applied to the substrate, they can be applied in the form of a printed pattern and/or sprayed on to the substrate. Additionally, they can be sprayed on top of the coated substrate in the form of a pattern. In one embodiment, the substrate is mechanically embossed before it is coated with the coating composition. The photoinitiator and/or cure altering agents can be placed in the embossed regions or, alternatively, placed in the non-embossed regions, to control the gloss level in the embossed and non-embossed regions. This can be particularly effective in surface coverings where a grout line is to be mimicked. For example, tile flooring includes tiles with relatively high gloss relative to the grout. Floor coverings can be prepared in which the regions of the floor covering imitating the tiles have a relatively high gloss, and the regions of the floor covering imitating the grout lines between the tiles have a relatively low gloss.

Methods of Applying the Compositions

The coating compositions can be applied via any conventional method known to those of skill in the art. Examples include brushing, roller, gravure, spin, flow, air knife or curtain coating. Although temperatures outside this range can be used, the coating compositions are typically applied at a temperature between room temperature and about 75° C.

As discussed in more detail below, the coating compositions can be cured with a combination of ultraviolet and electron beam radiation, a plurality of ultraviolet irradiations and/or photoinitiator concentrations at different regions within or in contact with the coating layer. No photoinitiator is required in those regions that are cured by electron beam. It is also possible to use thermal curing agents such as peroxides in this process to create the differential gloss effects. In this case, heat or a combination of heat and UV irradiations may be employed in the polymerization conditions.

Methods of Obtaining Differential Gloss In-Register

The various methods described below for achieving differential gloss in register are different ways of achieving a common goal, that being obtaining a top coat layer with differential gloss in various regions, in register with an applied pattern including photoinitiators and/or cure altering agents. The compositions are applied in such a manner that the UV-curable components in at least one region contain or are in contact with photoinitiators and/or cure altering agents in the pattern. The UV cure is promoted or inhibited in the first region of the pattern containing the cure altering agents, or more highly promoted in the first region that include higher concentrations and/or different types of photoinitiators. The differential curing of the first and second regions can be accomplished in one process step, or in multiple process steps, for example, using two or more sets of UV curing conditions or a combination of UV and EB curing conditions. In one embodiment, the first region is polymerized by heat, alone or in combination with UV irradiation.

In one embodiment, a pattern including a photoinitiator is printed on a surface to be coated. A coating composition without photoinitiator is applied, and exposed to UV. Photopolymerization occurs substantially over those regions of the pattern including the photoinitiator. The cured regions have a relatively lower gloss. The uncured components are subjected to electron beam (EB) irradiation, resulting in a higher gloss in those regions. The previously cured components, when contacted with EB irradiation, still maintain the relatively lower gloss. The result is a gloss-in-register with the pattern. The gloss level can also be controlled by adjusting the type and concentration of the photoinitiator and the UV dosage and intensity. The photoinitiator can alternatively or additionally be sprayed on top of selected regions of the top coat layer.

In another embodiment, differential curing involves printing a pattern including cure altering agents (i.e., accelerators or inhibitors) and/or photoinitiator in selected regions. In this embodiment, the coating composition includes photoinitiators, and photopolymerization is accelerated or inhibited over those regions containing the cure altering agents, and/or promoted in those regions including additional photoinitiator. Different sets of UV curing conditions or a combination of UV and EB curing can be used to provide a differential gloss in register with the pattern of cure altering agents and/or additional photoinitiator.

A number of surface coverings can be prepared using the methods described herein. The coverings can include a substrate, for example, a foamable substrate with a wear layer, which may or may not be chemically and/or mechanically embossed. The coating layer can also be subjected to mechanical embossing, in one embodiment, after the second region is cured.

Ultraviolet Irradiation

UV irradiation polymerizes the ethylenically unsaturated groups in the UV-curable components of the coating composition, turning the liquid as applied to a gel or solid layer. The first set of polymerization conditions from UV exposure may or may not fully cure the first region of the topcoat. The first set of polymerizing conditions is typically done in the presence of oxygen, but in some cases it can be done in an inert atmosphere. To function as an acceptable product, both first and second regions of the topcoat need to be sufficiently cured to attain the desired surface properties.

Low gloss is apparent to the naked eye when light is reflected from a micro-roughened surface in a diffuse manner. The micro-roughened surface can be achieved by using a flatting agent such as silica. The differential gloss level of the different regions of the wear layer on the finished product can be effected by a number of factors, including temperature, UV peak intensity, and irradiation dosage. UV irradiation typically occurs between 200 and 400 nm. Photoinitiators can be matched to particular UV wavelengths. UV irradiation can be provided using any conventional UV source, examples of which include UV lamps such as microwave UV source lamps and standard medium pressure mercury vapor lamps. The irradiation can be conducted under an inert atmosphere or an oxygen-containing atmosphere. In one embodiment, the first set of polymerization conditions involves UV curing in an oxygen-containing atmosphere, and the second set of polymerization conditions involves UV curing in an inert or nitrogen-rich atmosphere.

In some embodiments, commercially available UV lamps may cause excessive heating of the coatings and substrates. Film distortion may result from this excessive heating. Film distortion can be minimized by using a drum as a heat sink for the UV lamps and maintaining the film temperature. The drum can be heated slightly to lower the viscosity of the coating sufficiently before cure to assist in the formation of the desired gloss.

Electron Beam Irradiation

The uncured regions can be cured by exposure to EB irradiation, advantageously in the form of low voltage electrons. If the regions cured by UV were only partially cured, rather than totally cured, exposure to the electron beam will complete the cure in these areas.

Electron beam curing is well known in the art, and is advantageously conducted in a nitrogen-rich or inert atmosphere. The heat is essentially eliminated using accelerated electrons, which permits the cured layer to be kept below its glass transition temperature and remain free of distortion. In one embodiment, the electron accelerating energy is between 150,000 and 300,000 electron volts. In another embodiment, the energy is less than about 130,000 electron volts. Use of energy less than about 130,000 electron volts can minimize discoloring, such as yellowing, that is relatively important for white decorative rigid film coatings.

Representative EB conditions are described in U.S. Pat. No. 6,110,315, the contents of which are hereby incorporated by reference. In one embodiment, the EB conditions involve low accelerating energy.

Mechanical Embossing

In some embodiments, one or more layers can be mechanically embossed. In those embodiments where the cured top coat layer is mechanically embossed, the embossing may take place after the top coat layer is cured and then heated to soften the layer. Mechanical embossing is typically conducted by heating a layer to be embossed to soften the layer and applying an embossing roll to the softened layer under pressure. If desired, the embossed layer can be annealed at a temperature at which the layer is not liquid.

In one embodiment, an embossed roll is used to mechanically emboss a substrate to be coated, and the embossed roll applies a photoinitiator and/or cure altering agent to the embossed regions or the non-embossed regions. This can be used to provide relatively low gloss in the embossed or non-embossed regions. This embodiment is particularly useful in forming surface coverings that mimic grout lines and the like.

An example of the methods described herein is shown in Scheme I, FIG. 1. As shown in Scheme I, an ink extender formulation that includes a photoinitiator is printed onto the surface of a rigid vinyl film (RVF) (10) to provide an RVF with various regions, in this case, square regions, including the photoinitiator (20). A radiation-curable coating composition including a matting agent and no photoinitiator is then coated onto the surface of the RVF to provide a printed, coated RVF (30). The film is then exposed to UV-radiation in air over a heated drum to cure only the areas that have printed photoinitiator on the surface of the RVF, providing a film with cured and uncured regions (40). The non-printed areas are free of photoinitiator and the coating is wet in these areas. The cured areas have a relatively low gloss level. The wet coating is cured using an electron beam to provide relatively high gloss levels in those regions including the previously uncured coating. The final sample (50) displays gloss-in-register (GIR) having low gloss in the printed areas and high gloss in the non-printed areas. The film can be laminated to a tile base to produce a decorative tile product.

The present invention will be better understood with reference to the following non-limiting examples.

EXAMPLES

Example 1
Representative Coating Compositions

A hydroxy terminated polyester (Polyester 1) was prepared as described in Example 1 of U.S. Pat. No. 5,663,003 with the following charge weights:

| | |
|---|---|
| 1,6 Hexanediol | 992.7 g |
| Glycerin | 133.5 g |
| Phthalic Anhydride | 1071 g |
| Dibutyltin Dilaurate | 0.5 g |

The reaction mixture was cooled and total amount of water collected was 135 grams. The final product gave an acid number of 2.4 and a hydroxyl number of 179, providing a hydroxyl equivalent weight of 316.

A coating composition including Polyester 1 was prepared by mixing the following charge in a flask equipped with heating mantel, stirrer, and dry air purge at 0.3 SCFH.

| | |
|---|---|
| Tone M-100, Hydroxyacrylate from Union carbide | 697.2 g |
| Sartomer SR395 (Isodecyl acrylate) | 596.1 g |
| Sartomer SR238(1,6 hexanediol diacrylate) | 127.8 g |
| Polyester 1 | 406.8 g |

This mixture was stirred briefly at 26° C. To the mixture was added:

| | |
|---|---|
| Desmodur W Bayer's isocyanurate dimer | 441.6 g |
| T12 catalyst (Dibutyl tin dilaurate) | 4.62 g |

This mixture was heated to 185° F. (85° C.) and maintained at this temperature for 8 hours. An infrared spectrum confirmed that all of the NCO groups had reacted. The mixture was cooled and to the flask was added:

| | |
|---|---|
| Acrylic Acid | 58.5 g |
| Degussa Flatting agent OK412 | 170 g |

Example 2
Representative Coating Composition

A second coating composition was prepared as described in Example 1 of U.S. Pat. No. 5,663,003. The composition was prepared from the following charge in a 2 Liter flask equipped with heating mantel, stirrer, and dry air purge at 0.25 SCFH:

| | |
|---|---|
| Tone M-100, Hydroxyacrylate from Union carbide | 126 g |
| Monomer mixture (27.5% by wt Sartomer SR499, 27.5% by wt Sartomer SR502, 45% by wt. Sartomer SR351) | 125 g |
| Polyester 1 | 35 g |

This mixture was heated to 100° F. The following was added:

| | |
|---|---|
| Desmodur N-3300, Bayer's isocyanurate trimer | 87 g |

This mixture was heated to 185° F. (85° C.) and maintained at this temperature for five hours. The mixture was cooled and to the flasks was added:

| | |
|---|---|
| Monomer mixture (27.5% by wt Sartomer SR499, 27.5% by wt Sartomer SR502, 45% by wt. Sartomer SR351) | 15 g |
| Surfactant Dow Coming 193 | 1 g |

An infrared spectrum confirmed that all of the NCO groups had reacted

Example 3
Representative Coating Composition
Acrylated Polyester 2

A hydroxy terminated polyester (polyester polyol) as described in Example 2 of U.S. Pat. No. 5,663,003 was prepared. The final product gave an acid number of 2.5 and a hydroxyl number of 207, providing a hydroxy equivalent weight of 274 and an estimated number average molecular weight of 880.

The polyester was acrylated as described in Example 7 of U.S. Pat. No. 5,663,003. The acid number of the product was 34. A coating composition including Polyester 2 was prepared from the following charge in a 12 liter flask:

| | |
|---|---|
| Trimellitic anhydride | 2259 g |
| 1,6-Hexanediol | 5291 g |
| Phthalic Anhydride | 1406 g |
| p-Toluenesulfonic acid | 1.8 g |

The flask was equipped with a mantle, stirrer, thermometer, temperature controller, gas inlet tube, and an upright condenser. The condenser was steam heated and packed with glass helices and had a thermometer on top. The still led to a water-cooled condenser that drained into a graduated cylinder. Water collected during the reaction was collected and measured. The batch was heated to 220° C. under a trickle of nitrogen (0.5 SCFH) gas during which time water of esterification was collected. The reaction mixture was further heated for 5 hr. during which time the vapors in column head had fallen from 98° C. to 65° C. at a nitrogen flow of 1.0 SCFH. The reaction mixture was cooled and the total amount of water collected was 643 grams. The final product gave an acid number of 2.5 and a hydroxyl number of 207. It therefore had a hydroxy equivalent weight of 274 and an estimated number average molecular weight of 880.

The polyester was acrylated as follows. The materials below were introduced into a 2000 ml flask equipped with a mantle, stirrer, thermometer, gas inlet tube, dropping funnel, and Barrett Trap with a water cooled condenser on top.

| | |
|---|---|
| Heptane | 100 ml |
| Polyester | 800 g |
| Acrylic Acid | 277 g |
| Monomethyl ether of hydroquinone | 0.1 g |
| P-Toluenesulfonic acid | 5.38 g |
| Phosphorus Acid | 0.6 g |
| Hydroquinone | 0.1 g |
| 2,6, Di-tert-butyl-4-methylphenol | 0.1 g |

The trap was filled to overflow with heptane. With dry air flow of 0.2 SCFH, the ingredients were heated to reflux at 98° C. to 105° C. while stirring vigorously and collecting water and displacing heptane in the trap. Heptane was added through the dropping funnel as required to maintain reflux at about 104° C. After 4 hours of reflux, approximately 65 ml of aqueous distillate had collected. All "water" and heptane were withdrawn from the trap and the dry air flow was increased to 2 SCFH. When distillation stopped, additional "heptane" had collected in the trap. The batch was cooled to 50° C. with a trickle of dry air. The acid number of the acrylated Polyester 2 was 34.

The coating composition was prepared from:

| | |
|---|---|
| Acrylated Polyester 2 | 750 g |
| Highly ethoxylated triacrylate SR9035 | 250 g |
| Surfactant Dow Corning 193 | 2.5 g |

To this composition was added 4% by wt of surface treated silica from Degussa as OK412. The mixture was blended using a Cowles type blade.

Example 4
Formation of Wear Layers with Differential Gloss-In-Register

This Example demonstrates that several types of photoinitiators and levels can be printed onto the opposite side of the decorative layer to afford surface wear layers with regions of high gloss and low gloss from the same coating after exposure to UV followed by electron beam. The 60 degree gloss measurements for the low gloss areas were found to be below 20.

Ink extender formulations 1a to 1 g, each containing photoinitiators, were printed onto the surface of rigid vinyl film using a 120 line pattern of roughly half inch squares using a flat bed ink press (Table 1). The most effective photoinitiator was found to be Irgacure 184.

The coating composition in Example 1 containing 7% wt Degussa OK412 and no photoinitiator was preheated to 130° F. to reduce the viscosity. A rigid film having a decorative layer on one side and a photoinitiator applied on the other side was fed into a coater such that the photoinitiator-containing side was coated. The coating composition was applied using a dead roll coater with two non-moving heated rolls. The gap between the two heated rolls was kept at a distance that is the sum of rigid film thickness plus desired coating thickness. The film was routed through the space between the two rolls (nip) in a manner that allowed the non-printed side of the rigid film to be coated (film side up). A reservoir was used to retain the coating in the nip. The temperature of the rolls is kept well below the glass transition temperature of rigid vinyl film (76° C.) but warm enough to maintain the resin viscosity to allow for improved flow characteristics to eliminate coating defects commonly observed for high viscosity coatings. The coating material was preheated in the reservoir. The coated film was routed over a 12.75 inch diameter heated drum 5 maintained at about 150° F. to maintain the desired coating viscosity and flow characteristics desired for the final coated film. The wrap of the film was about 180 degrees. At 90 degree wrap the film was exposed to UV irradiation 6 from a UV lamp source where energetic photons initiate radical polymerization of the ethylenic groups only in areas where the coating is over the selected printed photoinitiator on the non-decorative side of the rigid vinyl film. The coating was exposed in air to a dosage of radiation from a conventional medium pressure mercury vapor lamp having a spectral output over the entire UV range 200–400nm. The distance of the bulb to the roll was about 5.5 inches. The coated printed film was processed at 4 ft/min with the line setup described herein over a heated drum. The coated printed film was exposed to a UV dosage of about 2.6 J/cm$^2$ to afford cured low gloss squares (about 8–18 gloss level at 60 deg.) and uncured high gloss coating in the non printed areas. The uncured wet coating on the film was subsequently processed through a low accelerating energy electron beam to form a high gloss abrasion resistant coating in the selected areas that did not include a photoinitiator printed onto the rigid vinyl film. The final coated film now displayed low gloss squares and high gloss between the squares (as shown in Scheme I, FIG. 1). The thickness of the coating in the high gloss and low gloss areas was found to be the same, about 1.6 mils. The ink extender formulations and resulting gloss levels are shown in Table 1.

TABLE 1

Ink Extender Formulations and Gloss Levels

| Examples | 1a | 1b | 1c | 1d | 1e | 1f | 1g |
|---|---|---|---|---|---|---|---|
| Ink Extender wt % | 95 | 90 | 85 | 95 | 90 | 85 | 90 |
| Benzophenone wt % | 5 | 10 | 15 | | | | |
| Irgacure 184 wt % (Ciba Geigy) | | | | 5 | 10 | 15 | |
| Irgacure 500 wt % (Ciba Geigy) | | | | | | | 10 |
| Wt % Percent Photoinitiator (PI) | 5 | 10 | 15 | 5 | 10 | 15 | 10 |
| Gloss Level in PI-printed areas | 14.6 | 13.5 | 16.8 | 18 | 7.8 | 7.8 | 11.3 |

TABLE 1-continued

Ink Extender Formulations and Gloss Levels

| Examples | 1a | 1b | 1c | 1d | 1e | 1f | 1g |
|---|---|---|---|---|---|---|---|
| Gloss level in non-printed PI areas | 69 | 69 | 69 | 69 | 69 | 69 | 69 |

The process parameters were as follows:—Coater—130° F., coating—130° F., drum temperature—150° F., line speed—4 fpm, lamp distance—5.5. inches, electron beam—135 KeV, electron beam dosage—10 Mrads.

Example 5
Formation of a Wear Layer with a Medium Gloss-In-Register

In a near identical fashion to that described for Example 4, the urethane-acrylate based coating composition in Example 2 containing 7% wt flatting agent (OK412) was processed to afford medium gloss in the printed areas and high gloss in the non printed vinyl areas. The coated films were exposed to about an intensity of about 143 mW/cm$^2$ 0.7 J/cm$^2$ of UV energy followed by electron beam cure. The same ink extender formulations were printed onto the opposite side of the printed decorative layer on the RVF. These are identified as formulations 2a to 2g.

TABLE 2

Ink Extender Formulations and Gloss Levels

| Examples | 2a | 2b | 2c | 2d | 2e | 2f | 2g |
|---|---|---|---|---|---|---|---|
| Ink Extender | 95 | 90 | 85 | 95 | 90 | 85 | 90 |
| Benzophenone | 5 | 10 | 15 | | | | |
| Irgacure 184 | | | | 5 | 10 | 15 | |
| Irgacure 500 | | | | | | | 10 |
| Percent Photoinitiator (PI) | 5 | 10 | 15 | 5 | 10 | 15 | 10 |
| Gloss Level in PI-printed areas | 31.8 | 36.6 | 38.1 | 29.5 | 30 | 31.3 | 32.1 |
| Gloss level in non-printed PI areas | 82.5 | 80.2 | 81.2 | 81.1 | 84.8 | 83.1 | 80.7 |

The process parameters were as follows:—Coater—140° F., coating—165° F., drum temperature—155° F., line speed—3 fpm, lamp distance—10 inches, electron beam—120 KeV, electron beam dosage—5 Mrads. The gloss levels were after gloss-in-register processing of composition 2 containing 7% OK412.

Example 6
Formation of a Wear Layer with Low and Medium Gloss Areas

In a similar fashion to that described for Example 4, a polyester acrylate-based coating containing 4% by weight flatting agent was processed to afford low gloss in the printed areas and medium gloss in the non-printed areas of the rigid vinyl film.

The printed ink formulation included 85% by weight ink extender and 15% by weight Irgacure. The process parameters were as follows:—Coater—140° F., coating—140° F., drum temperature—150° F., line speed—4 fpm, lamp distance—5.5 inches, electron beam—120 KeV, electron beam dosage—5 Mrads. The gloss levels were after gloss-in-register processing of composition 3. The coated film was cured at an intensity of 61 6 mW/cm$^2$ and dosage of 2.3 J/cm$^2$ followed by electron beam cure. The gloss level in the photoinitiator printed square areas was 14.8, and the gloss level in non-printed photoinitiator areas was 53.

Example 7
Inclusion of a Photoinitiator in Both the Coating Composition and in the Printed Areas As described in Example 4, a photoinitiator ink extender was printed onto the opposite side of a decorative layer. The coating composition in Example 1 containing 7% by weight flatting agent and three different levels of photoinitiator were coated and cured in a similar fashion to that described in Example 4. The UV exposure was about 1 J/cm$^2$ followed by electron beam cure.

In this Example, a photoinitiator was printed in various regions and was also present in the coating compositions. The concentration of photoinitiator was higher in the printed regions, but present in the non-printed regions as well.

When the coating composition included 0.25% by weight Irgacure-184, the gloss level in the printed areas was 15.6 and in the non-printed areas was 77.7. When the coating composition included 0.75% by weight Irgacure-184, the gloss level in the printed areas was 13.3 and in the non-printed areas was 55.9. When the coating composition included 1.0% by weight Irgacure-184, the gloss level in the printed areas was 12.1 and in the non-printed areas was 38.5.

Examples 8–12
Inclusion of Activators, Photosensitizers and Alternative Photoinitiators Examples 8–12 demonstrate that one can print accelerators or deactivators on the rigid vinyl film to increase the gloss level in the printed areas relative to the non-printed areas of the rigid vinyl film. The coating composition in Example 1 was formulated to contain 1.7% benzophenone, 0.9% wt Irgacure-184, and 7% OK412 silica. To this composition was added various accelerators to show the effect on gloss level of the final cured coating. The formulations and gloss levels are summarized in Table 3.

The process parameters were as follows: Coater—140° F., coating—138° F. in Example 8, 140° F. in Example 9, 138° F. in Example 10, 136° F. in Example 11, and 144° F. in Example 12 drum temperature—153° F., line speed—20 fpm in Example 8–12, lamp distance—5.5 inches, intensity—811 mW/cm$^2$, dosage—250 mJ/cm$^2$, electron beam—120 KeV, electron beam dosage—5 Mrads.

TABLE 3

Formulations and Gloss Levels

| Examples | 8 | 9 | 10 | 11 | 12 |
|---|---|---|---|---|---|
| Weight of coating | 200 | 196 | 200 | 196 | 196 |
| MDEA | | 4 | | | |
| ITX | | | 0.6 | | |
| Daracure 1173 | | | | 4 | |
| Irgacure 907 | | | | | 4 |
| Gloss Level in PI-printed areas | 15 | 72 | 29 | 50 | 73 |

Example 8 was used as a control, to determine the gloss level of the base composition with 1.7% benzophenone and 0.9% wt Irgacure-184. The gloss level was found to be about 15 (60 degree level) after UV processing. In Example 9, addition of the amine activator metbyldiethanolamine to the composition in Example resulted in a gloss level of 72. Examples 10–12 show that other types of materials such as photosensitizers (in this case, ITX) or alternative initiators used to cure pigmented coatings can accelerate the cure and result in a higher gloss level than the control Example 8. From these results, it is obvious that printing such activators, photosensitizers, or alternative photoinitiators on the RVF can result in higher gloss levels in the printed areas than in the non-printed areas of the rigid vinyl film.

The optimum dimensional relationships for the parts of the invention, to include variations in size, materials, shape, form, function and manner of operation, assembly, and use, are deemed readily apparent and obvious to one skilled in the art. All equivalent relationships to those illustrated in the drawing and described in the specification are intended to be encompassed by the present invention. Further, the various components of the embodiments of the invention may be interchanged to produce further embodiments and these further embodiments are intended to be encompassed by the present invention.

We claim:

1. A surface covering or surface covering component comprising:
   a) a substrate;
   b) a patterned layer overlying the substrate, wherein the pattern layer comprises a first gloss controlling agent, the first gloss control agent being selected from the group consisting of at least one thermal initiator, at least one photoinitiator, at least one photosensitizer, at least one accelerator, at least one inhibitor and combinations thereof; and
   c) a crosslinked top coat overlying the patterned layer, the crosslinked top coat comprising a flatting agent and having a first region with a first concentration of the first gloss controlling agent and a second region with a second different concentration of the first gloss controlling agent, wherein other than any gloss controlling agent and the flatting agent, the crosslinked top coat is homogeneous,
   whereby the first region has a first gloss level and the second region has a second different gloss level.

2. The surface covering or surface covering component of claim 1, wherein the crosslinked top coat directly overlies the patterned layer.

3. The surface covering or surface covering component of claim 1, wherein the crosslinked to coat is continuous and overlies substantially the entire substrate and patterned layer.

4. The surface covering or surface component of claim 1, wherein the first gloss controlling agent is a first thermal initiator, and the first and second regions of the crosslinked to coat comprise a second different thermal initiator.

5. The surface covering or surface covering component of claim 1, wherein the patterned layer is in direct contact with the crosslinked top coat.

6. The surface covering or surface covering component of claim 1, wherein the crosslinked top coat comprises a thermal curing agent.

7. The surface covering or surface covering component of claim 1, wherein the first gloss controlling agent comprises an initiator selected from the group consisting of photoinitiators, thermal initiators and combinations thereof.

8. The surface covering or surface covering component of claim 7, wherein the second region comprises substantially no photoinitiator and the first region comprises a photoinitiator.

9. The surface covering or surface covering component of claim 1, wherein the patterned layer is in contact with the crosslinked top coat, and wherein the crosslinked top coat in the second region is substantially free of the first gloss controlling agent.

10. The surface covering or surface covering component of claim 1, wherein the patterned layer is in contact with the crosslinked top coat, and wherein the top coat in the second region is substantially free of thermal initiator.

11. The surface covering or surface covering component of claim 1, wherein the patterned layer is in contact with the crosslinked top coat, wherein the patterned layer comprises a second gloss controlling agent adjacent the first region, wherein the the first gloss controlling agent is a photoinitiator, and wherein the crosslinked top coat in the first and second regions comprises the first gloss controlling agent.

12. The surface covering or surface covering component of claim 11, wherein the top coat in first region comprises the second gloss controlling agent.

13. The surface covering or surface covering component of claim 1, wherein the regions of different gloss levels are in register with the patterned layer.

14. The surface covering or surface covering component of claim 1, wherein the patterned layer is in contact with the crosslinked top coat, wherein the pattern layer comprises the first gloss controlling agent adjacent the first region, and wherein the crosslinked top coat comprises a photoinitiator other than the first gloss controlling agent in the first and second regions.

15. The surface covering or surface component of claim 1, wherein the first gloss controlling agent is a first photoinitiator, and the first and second regions of the crosslinked top coat comprise a second different photoinitiator.

16. The surface covering or surface covering component of claim 1, wherein the second concentration of the first gloss controlling agent is zero.

17. The surface covering or surface covering component of claim 1, wherein the patterned layer is an ink layer.

18. The surface covering or surface covering component of claim 1, wherein the patterned layer is discontinuous.

19. The surface covering or surface covering component of claim 7, wherein the second region comprises a photoinitiator and the first region comprises a thermal initiator.

20. The surface covering or surface covering component of claim 9, wherein the first gloss controlling agent is a photoinitiator.

21. The surface component of claim 1, wherein the concentration of the first gloss controlling agent in one of the two regions of the crosslinked top coat is zero.

22. A surface covering component comprising:
   a) a film having an exposed surface,
   b) a patterned layer overlying the film on the side of the film opposite the exposed surface, wherein the pattern layer comprises a first gloss controlling agent, the first gloss controlling agent being selected from the group consisting of at least one thermal initiator, at least one photoinitiator, at least photosensitizer, at least one accelerator, at least one inhibitor and combinations thereof, the first gloss controlling agent forming a design, and
   c) a crosslinked top coat overlying the patterned layer on the side of the pattern layer opposite the film, wherein the crosslinked top coat comprises at least two areas with gloss levels different from one another and at least one of the areas is substantially in register with at least a portion of the design of the patterned layer.

23. The surface covering component of claim 22, wherein the patterned layer is discontinuous.

24. The surface covering component of claim 22, wherein the patterned layer further comprises a pigment.

25. The surface covering component of claim 22, wherein the film is a transparent or translucent film.

26. The surface covering component of claim 22, wherein the crosslinked top coat is transparent or translucent.

27. The surface covering component of claim 22, wherein the film comprises a second patterned design interposed between the film and the top coat.

28. The surface covering component of claim 27, wherein the second design comprises a pigment.

29. The surface covering component of claim 27, wherein the patterned layer containing a gloss controlling agent is in register with the second patterned design.

30. The surface covering or surface covering component of claim 15, wherein the crosslinked top coat comprises the same photoinitiator in the first and second regions, the photoinitiator in the first and second regions being the same as the photoinitiator of the patterned layer.

31. The surface covering component of claim 22, wherein other than any gloss controlling agent, the crosslinked top coat is homogeneous.

32. The surface covering component of claim 22, wherein the top coat further comprises a flatting agent, and wherein other than any gloss controlling agent and the flatting agent, the crosslinked top coat is homogeneous.

33. The surface covering component of claim 22, wherein the exposed surface of the film is a printed surface comprising a design.

34. The surface covering component of claim 33, wherein the patterned layer is in register with at least a portion of the design of the printed surface.

35. The surface covering component of claim 33, wherein the printed surface comprises a foam controlling agent.

36. The surface component of claim 22, wherein the concentration of the first gloss controlling agent in the two areas of the crosslinked top coat is different.

* * * * *

UNITED STATES PATENT AND TRADEMARK OFFICE
CERTIFICATE OF CORRECTION

PATENT NO. : 6,890,625 B2
DATED : May 10, 2005
INVENTOR(S) : Sigel et al.

It is certified that error appears in the above-identified patent and that said Letters Patent is hereby corrected as shown below:

Column 17,
Line 39, change "claim 1" to -- claim 5 --
Line 42, change "to" to -- top --

Signed and Sealed this

Fifth Day of July, 2005

JON W. DUDAS
*Director of the United States Patent and Trademark Office*